US009963049B2

(12) United States Patent
Quast et al.

(10) Patent No.: US 9,963,049 B2
(45) Date of Patent: May 8, 2018

(54) RAIL PAIR FOR A VEHICLE SEAT

(71) Applicant: Adient Luxembourg Holding S.à.r.l., Luxembourg (LU)

(72) Inventors: Ingo Quast, Duesseldorf (DE); Erik Sprenger, Wermelskirchen (DE); Michael Zacharias, Leichlingen (DE); Vitali Kheyfets, Wuppertal (DE)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 0 days. days.

(21) Appl. No.: 15/515,341

(22) PCT Filed: Sep. 25, 2015

(86) PCT No.: PCT/EP2015/072133
§ 371 (c)(1),
(2) Date: Mar. 29, 2017

(87) PCT Pub. No.: WO2016/050648
PCT Pub. Date: Apr. 7, 2016

(65) Prior Publication Data
US 2017/0232870 A1    Aug. 17, 2017

(30) Foreign Application Priority Data
Sep. 30, 2014    (DE) .................. 10 2014 219 866

(51) Int. Cl.
*B60N 2/02* (2006.01)
*B60N 2/07* (2006.01)
*B60N 2/08* (2006.01)

(52) U.S. Cl.
CPC ......... *B60N 2/0732* (2013.01); *B60N 2/0705* (2013.01); *B60N 2/0818* (2013.01)

(58) Field of Classification Search
CPC .......... B60P 7/0815; B60P 7/0807; B60P 7/08
(Continued)

(56) References Cited

U.S. PATENT DOCUMENTS 5,224,749 A    7/1993    Gauger et al.
7,665,791 B2 *    2/2010    Kojima ............... B60N 2/0705
248/430

(Continued)

FOREIGN PATENT DOCUMENTS

DE    10 2011 086 650 A1    5/2013
DE    10 2012 106 826 A1    1/2014
(Continued)

*Primary Examiner* — Steven M Marsh
(74) *Attorney, Agent, or Firm* — McGlew and Tuttle, P.C.

(57) ABSTRACT

A rail pair (1), for a vehicle seat (10), includes at least a lower seat rail (S1) and an upper seat rail (S2), which engage around one another in such a way that a rail profile is formed and which can be moved in relation to each other in a longitudinal direction (L) and can be interlocked by a rail locking device (2). Rolling elements (4) are arranged between the seat rails (S1, S2) in an interaction region. The upper seat rail (S2) includes two side walls (S2.1, S2.2), which two side walls (S2.1, S2.2), in a vertical orientation, protrude largely in parallel and perpendicularly from a bottom region (S2.3). One of the side walls (S2.2) is bent outward in a continued course in some regions of the longitudinal direction (L).

20 Claims, 3 Drawing Sheets

(58) Field of Classification Search
USPC .................................. 248/419, 424, 429, 430
See application file for complete search history.

(56) References Cited

U.S. PATENT DOCUMENTS

| | | | | |
|---|---|---|---|---|
| 2013/0075571 A1* | 3/2013 | Suck | ...................... | B60N 2/072 |
| | | | | 248/430 |
| 2013/0206952 A1* | 8/2013 | Yamada | ............... | B60N 2/0722 |
| | | | | 248/429 |
| 2013/0341479 A1* | 12/2013 | Yamada | ............... | B60N 2/0722 |
| | | | | 248/430 |
| 2014/0231610 A1* | 8/2014 | Hoshihara | ............ | B60N 2/0705 |
| | | | | 248/430 |
| 2014/0353454 A1* | 12/2014 | Yamada | ............... | B60N 2/0705 |
| | | | | 248/430 |
| 2014/0354023 A1* | 12/2014 | Yamada | ............... | B60N 2/0732 |
| | | | | 297/344.1 |
| 2017/0001542 A1* | 1/2017 | Loppolo | ............. | B60N 2/0727 |

FOREIGN PATENT DOCUMENTS

| | | |
|---|---|---|
| EP | 0 856 429 A1 | 8/1998 |
| EP | 2 163 422 A2 | 3/2010 |
| FR | 2 903 353 A1 | 1/2008 |

\* cited by examiner

RAIL PAIR FOR A VEHICLE SEAT

CROSS REFERENCE TO RELATED APPLICATIONS

This application is a United States National Phase Application of International Application PCT/EP2015/072133, filed Sep. 25, 2015, and claims the benefit of priority under 35 U.S.C. § 119 of German Application 10 2014 219 866.6 filed Sep. 30, 2014, the entire contents of which are incorporated herein by reference.

FIELD OF THE INVENTION

The invention relates to a rail pair for a vehicle seat and to a longitudinal adjustment element with two such rail pairs, and a vehicle seat with a longitudinal adjustment element, comprising two such rail pairs.

BACKGROUND OF THE INVENTION

EP 0 856 429 A1 discloses a seat rail pair in which four balls are provided between a lower rail and an upper rail. In each case two balls rest on the two sides of an obliquely inclined end section of the lower rail, which end section is adapted as a ball raceway in its shape to the balls. The upper rail encloses the balls on the respective other side with sections with a different inclination as ball raceways. The locking of the two seat rails is carried out by means of a bar which introduced off center. When there are unequal loads there is the risk of the balls leaving their raceways and causing adjacent regions of the rail profiles to become deformed i.e. the material becomes locally plastically deformed owing the high pressures and leaves behind marks in the form of spherical depressions or caterpillar-like depressions which, when the seat rails are adjusted, become perceptible in the form of undesired fluctuations in force and accelerations.

SUMMARY OF THE INVENTION

An object of the present invention is to specify an improved rail pair for a vehicle seat and a vehicle seat with such an improved rail pair.

The object is achieved according to the invention with a rail pair for a vehicle seat, comprising at least one lower seat rail and one upper seat rail which engage around one another in such a way that a rail profile is formed and can move relative to one another in the longitudinal direction and are lockable to one another by means of a rail locking means, wherein the upper seat rail comprises two side walls which project largely in parallel (extend for a length nearly or essentially in parallel) and perpendicularly from the floor region in a vertical orientation, wherein in certain areas in the longitudinal direction at least one of the side walls is provided with a bend and in particular is bent outward, in the continued course in the vertical orientation.

The advantages which are achieved with the invention consist, in particular, in the fact that a rail pair which is embodied in such a way with a side wall of one of the seat rails which is bent in certain areas or bent outward, and therefore the strength, in particular peel strength, of this seat rail in this region is significantly improved by oblique positioning of the side wall or side edge.

In one embodiment, the at least one side wall is bent outward in such a way that it is provided, at least in a connecting region of the associated seat rail with a bend which extends at least in the connecting region along the longitudinal direction of the seat rail. As a result of the oblique positioning of the one side wall only in connecting regions, for example of further components such as, for example, a seat belt attachment, the strength, in particular the peel strength, in this attachment region is significantly increased, and therefore improved, compared to the other rail regions with vertical side walls. Such a bend in the seat belt attachment region avoids bulging out at the side walls or rail edges under the seat belt tension. As a result of oblique positioning also of the side wall of the lower rail corresponding to the oblique positioning of the side wall of the upper rail, the strength, in particular the peel strength, can also be increased further.

According to a further embodiment, the bend in the at least one seat rail is made essentially at the height of an upper edge of the other seat rail or below the upper edge. For homogeneous contact and homogeneous engagement of the seat rails one in the other, the lower rail is provided with a corresponding bend or with a corresponding partially oblique position of the side wall. Alternatively, the bend can also be made above the upper edge in the at least one seat rail.

Furthermore, the bend can be made in the region of a rail locking means and/or a bearing in the at least one seat rail. In this context, the bend is made in the seat rail above the releasable rail locking means.

In this context, the rail locking means engages in the bent wall region in the seat rails and locks them to one another. Alternatively, the rail locking means can engage in the vertical and straight wall region in the seat rails and lock them to one another. The bend is then made in the seat rails underneath the rail locking means.

Furthermore, a bent rail end of the lower seat rail is arranged in parallel with the bent region of the upper seat rail.

In order to form at least one rolling raceway for the rolling elements in the interaction region of the seat rails, the at least one side wall is essentially U-shaped in cross section in the outwardly bent region. For example, both limbs of the U-shaped region which is bent outward are arranged in parallel with one another.

In order to form a plurality of rolling raceways, at least one of the two limbs has a corrugated profile or has multiple bends or kinks.

In one possible embodiment, two, three or more rolling raceways are provided per side of the rail pair—on the inside or outside—in the interaction region of the seat rails, wherein the rolling elements of each rolling raceway can have at least two or more rail contacts.

For easy movement of the seat rails with respect to one another, a plurality of rolling elements, for example rolling balls or rolling cylinders are arranged one next to the other for each rolling raceway.

The vehicle seat according to the invention comprises, for the purpose of adjusting the longitudinal position thereof, a longitudinal adjustment element which is equipped with two of the rail pairs described above.

As a result of the equipment of the vehicle seat with two rail pairs according to the invention, said vehicle seat has, compared with conventional vehicle seats, an improved longitudinal adjustment element with improved rail guidance and rail strength, wherein as a result of the kinked or outwardly bent side wall (bend in the side wall) according to the invention a stiffening/support is achieved and an increased peel strength is obtained.

A vehicle seat which is equipped with two rail pairs according to the invention is used in a motor vehicle, specifically as a rule as a front seat. The rail pairs which serve as longitudinal adjustment elements are mounted in such a way that one of the seat rails forms the lower rail and a guide rail which is fixed to the vehicle structure, and the other seat rail forms the upper rail and a sliding rail which is fixed to the seat structure. The functions of the two seat rails can, however, also be precisely reversed.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
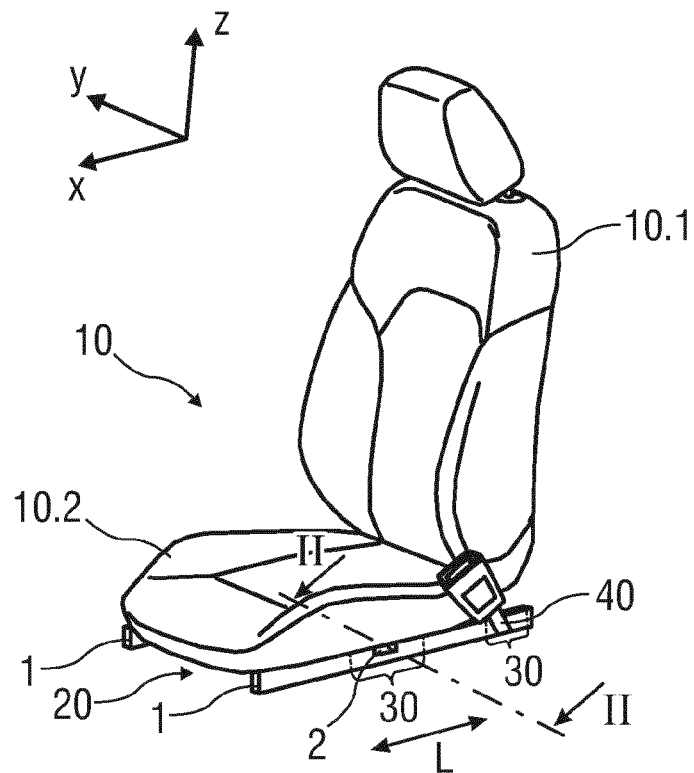
FIG. 1 is a schematic perspective illustration of a vehicle seat having two rail pairs.

Referring to the drawings, corresponding parts are provided with the same reference symbols in all the figures.

FIG. 1 is a schematic perspective illustration of a vehicle seat 10.

The vehicle seat 10 comprises a seat back rest 10.1 and a sitting surface 10.2. Furthermore, the vehicle seat 10 is embodied so as to be longitudinally displaceable in the longitudinal direction L with respect to a floor or some other vehicle structure. For this purpose, the vehicle seat 10 comprises a longitudinal adjustment element 20.

The longitudinal adjustment element 20 comprises at least two rail pairs 1 which are arranged in parallel with one another on the underside of the sitting surface 10.2.

Figure 2:
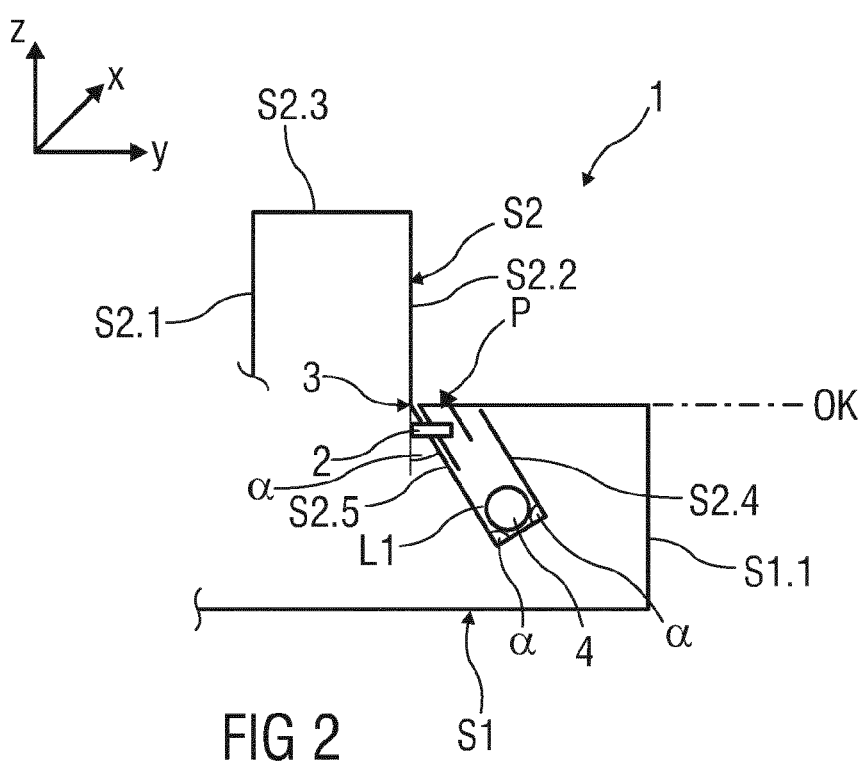
FIG. 2 is a schematic cross-sectional view of an exemplary embodiment of a rail pair according to the invention having at least one partially outwardly bent side wall of one of the seat rails.

In an attachment region 30, for example in the region of a seat belt attachment 40 or a rail locking device (locking means) 2, the respective rail pair 1 is correspondingly shaped as described below:

FIG. 2 is a schematic sectional view of a single rail pair 1 for the vehicle seat 10 in the region of a rail locking means 2.

The rail pair 1 according to the invention comprises two seat rails S1 and S2. Here, for example the seat rail S1 is a lower rail which is fixed to the vehicle, and the other seat rail S2 is an upper rail which is fixed to the seat.

For the purpose of longitudinal adjustment on its two sides located to the left and right in the direction of travel, the vehicle seat 10 has in each case a rail pair 1 according to the invention. The lower seat rail S1 which is fixed to the vehicle forms here a guide rail for the upper seat rail S2 which is fixed to the seat and is embodied as a sliding rail. The seat rails S1, S2 are of the same design on both sides of the vehicle seat 10, with the result that in the text which follows only the seat rails S1, S2 and the rail pair 1 on one side will be described for the sake of simplicity.

The seat rails S1, S2 are shaped in such a way that they engage one in the other in such a way that they form a rail profile and can move relative to one another in the longitudinal direction L and are lockable to one another by means of a rail locking means 2.

The two seat rails S1, S2 are embodied in approximately a U shape and have two side walls S2.1 and S2.2 which project largely in parallel (extend for a length nearly or essentially in parallel) and perpendicularly from the floor region S2.3 in a vertical orientation (Z direction) of said floor region S2.3.

In the continued course, one of the side walls S2.1 or S2.2 in the exemplary embodiment according to FIG. 2 the side wall S2.2, is bent outward in the vertical orientation. In this context, the upper side wall S2.2 has, in the longitudinal direction L, alternate sections with long and short perpendicular upper side walls S2.2. The free ends of the upper side wall S2.2 are bent outwardly repeatedly, wherein a first bend 3 is bent outward with a bending angle α of less than 80°, in particular less than 75° and greater than 35°.

The first bend 3 is referred to only for short as bend 3 in the text which follows.

The bends which are made in the continued course have a bending angle α of greater than 80° and form rolling raceways L1 to L3.

According to one development, the side wall S2.2 can be provided with the bend 3 only in the attachment regions 30 and bent outward. Outside the attachment regions 30 the first bend 3 is not present, and the free ends of the upper side wall S2.2 are provided with bends with a bending angle α of greater than 80° or run perpendicularly.

A rail pair 1 which is embodied in such a way with a side wall S2.2, which is bent in certain areas or bent outward, of the seat rail S2, and therefore the strength, in particular the peel strength, of this seat rail S2 is significantly improved in this region by oblique positioning of the side wall S2.2 or side edge. The partially oblique position of the side wall S2.2, for example at an angle of greater than 100° to 150°, has a force introduction point in the direction as shown with respect to the arrow P. As a result, extension of the seat rail S2 and of the profile, for example in the attachment region 30 such as a seat belt attachment region 40 or in the region of a rail locking means 2, is reduced. The profile geometries of the seat rail S2 which differ from a force action line tend to orient themselves along this line of the arrow P. This is forestalled by the oblique position of the side wall S2.2.

The side wall S2.2 can be bent outward in the longitudinal direction L only in certain areas in such a way that said side wall S2.2 is provided at, least in one of the attachment regions 30 of the associated seat rail S2 with the bend 3 which extends, at least in the attachment region 30, in the longitudinal direction L of the seat rail S2. As a result of the oblique positioning of the side wall S2.2 only in this attachment region 30 of, for example, further components such as, for example, a seat belt attachment, the strength, in particular the peel strength, in this attachment region 30 is significantly increased and improved compared to the other rail regions with only vertical side walls S2.2.

Furthermore, a side wall S1.1, adjoining the partially outwardly bent side wall S2.2 of the seat rail S2, of the lower seat rail S1 is correspondingly bent inward. As a result of oblique positioning, also of the side wall S1.1 of the lower rail in a way corresponding to the oblique positioning of the side wall S2.2 of the upper rail, the strength is increased even further and homogeneous contact between the two seat rails S1, S1.2 is brought about.

Figure 3:
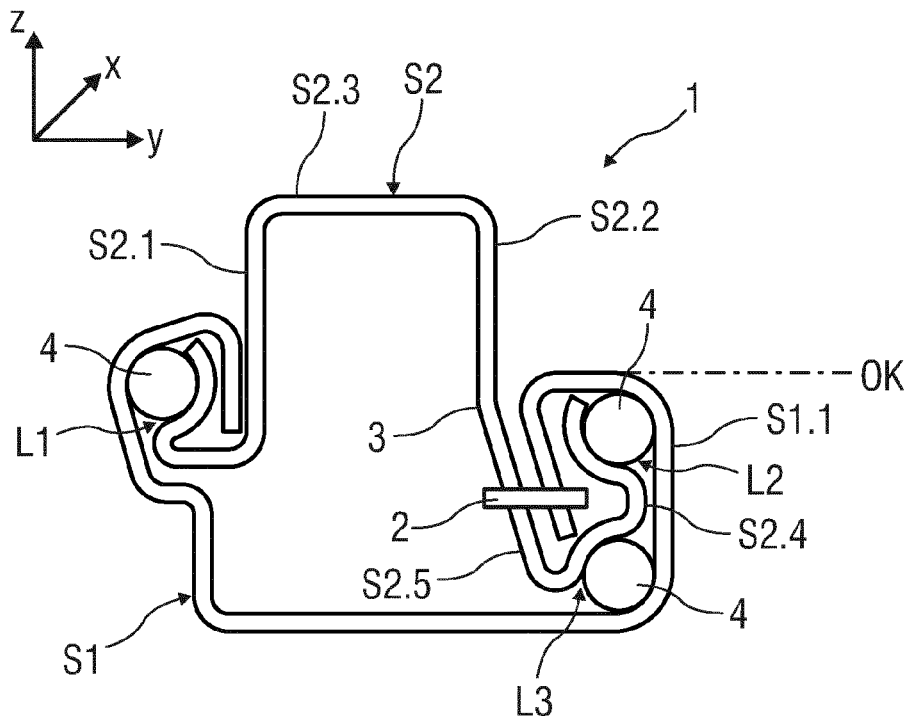
FIG. 3 is a schematic cross-sectional view of a further exemplary embodiment of a rail pair according to the invention having at least one partially outwardly bent side wall of one of the seat rails.

In the exemplary embodiment according to FIG. 1, the bend 3 in the seat rail S2 is arranged essentially at the level of an upper edge OK of the other seat rail S1. Alternatively, the bend 3 can also be made in the side wall S2.2 underneath the upper edge OK, as illustrated in FIG. 3.

Furthermore, the upper seat rail S2 is curved repeatedly outward in the oblique wall region. In particular the side wall S2.2 in the outwardly bent wall region is embodied in a U shape in cross section. In one embodiment, the two limbs S2.4, S2.5 of the repeatedly outwardly bent U-shaped region are arranged parallel to one another, as a result of which a rolling raceway L1 for at least one rolling element 4 is formed at least on this side of the rail pair.

The side walls S1.1 of the lower seat rail S1 are curved or bent repeatedly inward so as to correspond to this. The seat rails S1, S2 are pushed one into the other in such a way that they engage one behind the other with their laterally curved or bent edges, as a result of which in these edge regions an interaction region of the seat rails S1, S2 in which rolling elements 4 are moveably mounted in rolling raceways L1 between the seat rails S1, S2 is formed.

FIG. 1 shows one of the sides of the rail pair with a rolling raceway L1.

FIG. 2 shows an exemplary embodiment of a further rail pair 1 with a plurality of rolling raceways L1 to L3. In order to perform a plurality of rolling raceways L1 to L3, at least one of the two limbs S2.4 of the outwardly curved or bent U-shaped region of the side wall S2.2 is provided with a target profile or is embodied so as to be repeatedly bent or kinked. In the exemplary embodiment, the corrugated profile of the limb 2.4 has two corrugation valleys which each form a rolling raceway L2, L3 for the rolling elements 4.

The side wall S2.2 is kinked or bent outward slightly underneath the upper edge OK of the other lower seat rail S1. On the side of the rail pair lying opposite, the rail pair 1 has just one rolling raceway L1 as a result of corresponding profiling of the ends of the side walls S2.1 of the seat rail S1, S2.

The rolling elements 4 on each rolling raceway L1 to L4 each have at least two rail contacts or contact points, wherein each seat rail S1, S2 is provided with at least one rail contact.

For a multiple, in particular double, triple or quadruple and symmetrical or asymmetrical configuration of the course of the rails with two, three or four rolling raceways L1 to L4, the edge regions of the seat rails S1, S2, are correspondingly bent and can form two rolling raceways L1 to L2 (FIG. 1), three rolling raceways L1 to L3 (FIG. 2) or four rolling raceways (FIGS. 3 and 4) with a corresponding number of rail contacts. In this context, the rolling raceways L1 to L4 can be distributed symmetrically or asymmetrically among the sides.

Depending on the shape and requirements made of the rail pair 1, the edge regions of the seat rails S1, S2 can be arranged towards the inside instead of towards the outside and therefore be configured conversely with their rolling raceways located on the inside (not illustrated). When the ends of the seat rails S1, S2 are arranged toward the inside, the first bend 3 is bent inward (not illustrated).

Figure 4:
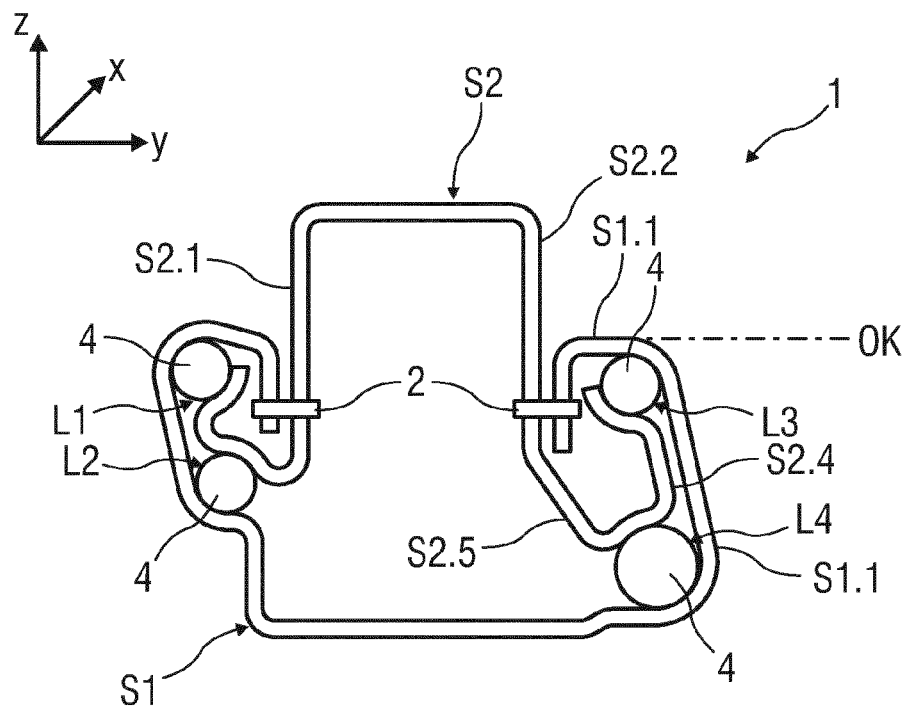
FIG. 4 is a schematic cross-sectional view of a further exemplary embodiment of a rail pair according to the invention having at least one partially outwardly bent side wall of one of the seat rails.
Figure 5:
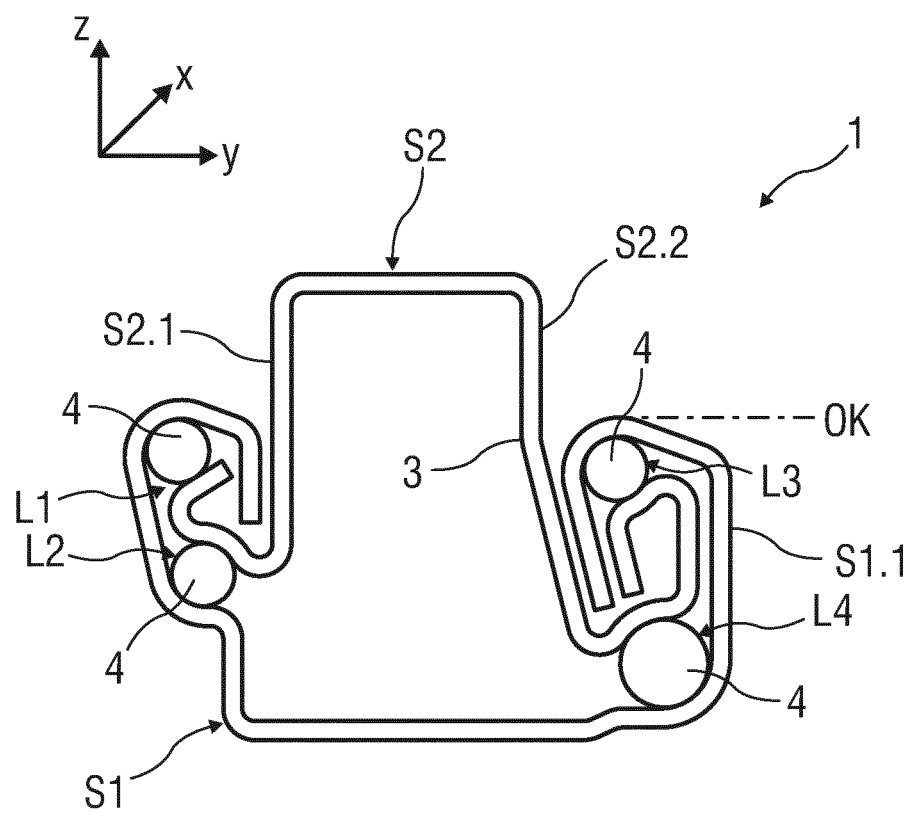
FIG. 5 is a schematic cross-sectional view of a further exemplary embodiment of a rail pair according to the invention having at least one partially outwardly bent side wall of one of the seat rails.

FIGS. 3 to 5 show further exemplary embodiments of rail pairs 1 with a symmetrical design and three rolling raceways L1 to L3 (FIG. 3) or four rolling raceways L1 to L4 (FIGS. 4 and 5) and correspondingly bent edge regions, wherein in each case the side wall S2.2 is kinked in the region of the upper edge OK of the lower seat rail S1 (FIGS. 3 and 5) or below the latter (FIG. 4) and is therefore bent outward at least partially obliquely.

The vehicle seat 10 comprises, for the purpose of adjusting its longitudinal position, the longitudinal adjustment element 20 which is equipped with two of the rail pairs 1 according to the invention as described above, according to FIGS. 1 to 4.

As a result of the equipment of vehicle seat 10 with two rail pairs 1 according to the invention, said vehicle seat has rail adjustment with greater strength compared to conventional vehicle seats.

Such a vehicle seat 10 is used in a motor vehicle, generally as a front seat. The rail pairs 1 serving as longitudinal adjustment elements 20 are mounted in such a way that one of the seat rails S1 forms the lower rail and a guide rail which is fixed in the vehicle structure, and the other seat rail S2 forms the upper rail and a sliding rail which is fixed to the seat structure. The functions of the two seat rails S1, S2 can, however, also be precisely reversed.

While specific embodiments of the invention have been shown and described in detail to illustrate the application of the principles of the invention, it will be understood that the invention may be embodied otherwise without departing from such principles.

The invention claimed is:

1. A rail pair for a vehicle seat, the rail pair comprising:
    a lower seat rail and
    an upper seat rail, wherein:
    the lower seat rail and the upper seat rail engage around one another in such a way that a rail profile is formed and can move relative to one another in a longitudinal direction and are lockable to one another by a rail locking device;
    the upper seat rail comprises two side walls which project largely in parallel and perpendicularly from a floor region in a vertical orientation;
    in certain areas in the longitudinal direction one of the side walls is provided with a bend in a continued course in a vertical orientation; and
    the bend in the upper seat rail is arranged essentially at a level of an upper edge of the lower seat rail.

2. The rail pair as claimed in claim 1, wherein the one of the side walls is bent inward or outward in such a way that the one of the side walls is provided, at least in a connecting region of the upper seat rail, with the bend which said bend extends at least in the connecting region along the longitudinal direction of the upper seat rail.

3. The rail pair as claimed in claim 1, wherein a side wall of the lower seat rail, which adjoins the side wall of the upper seat rail, which is bent partially inward or outward, is bent outward or inward in a corresponding way.

4. The rail pair as claimed in claim 1, wherein the one of the side walls is essentially U-shaped in cross section in an outwardly or inwardly bent region.

5. The rail pair as claimed in claim 4, wherein two limbs of the outwardly or inwardly bent region are arranged in parallel with one another.

6. The rail pair as claimed in claim 5, wherein at least one of the two limbs has a corrugated profile.

7. The rail pair as claimed in claim 1, further comprising two or more rolling raceways in an interaction region of the seat rails, wherein rolling elements of each rolling raceway have at least two or more rail contacts.

8. A longitudinal adjustment element comprising:
a rail locking device; and
at least two rail pairs comprising:
a lower seat rail; and
an upper seat rail, wherein:
the lower seat rail and the upper seat rail engage around one another in such a way that a rail profile is formed and can move relative to one another in a longitudinal direction and are lockable to one another by the rail locking device;
the upper seat rail comprises two side walls which extend essentially or nearly in parallel and perpendicularly from a floor region in a vertical orientation;
in certain areas in the longitudinal direction one of the side walls has a bend in a continued course in a vertical orientation; and
the bend in the upper seat rail is arranged essentially at a level of an upper edge of the lower seat rail.

9. A vehicle seat comprising:
a seat part;
a longitudinal adjustment element connected to the seat part, the longitudinal adjustment element comprising a rail locking device; and at least two rail pairs comprising:
a lower seat rail; and
an upper seat rail, wherein:
the lower seat rail and the upper seat rail engage around one another in such a way that a rail profile is formed and can move relative to one another in a longitudinal direction and are lockable to one another by the rail locking device;
the upper seat rail comprises two side walls which extend essentially or nearly in parallel and perpendicularly from a floor region in a vertical orientation;
in certain areas in the longitudinal direction one of the side walls has a bend in a continued course in a vertical orientation; and
the bend in the upper seat rail is arranged essentially at a level of an upper edge of the lower seat rail.

10. A vehicle seat as claimed in claim 9, wherein the one of the side walls is bent inward or outward, providing the bend, in such a way that the one of the side walls is provided, at least in a connecting region of the upper seat rail, with the bend which said bend extends at least in the connecting region along the longitudinal direction of the upper seat rail.

11. A vehicle seat as claimed in claim 9, wherein a side wall of the lower seat rail, which adjoins the side wall of the upper seat rail, which is bent partially inward or outward, is bent outward or inward in a corresponding way.

12. A vehicle seat as claimed in claim 9, wherein the one of the side walls is essentially U-shaped in cross section in an outwardly or inwardly bent region.

13. A vehicle seat as claimed in claim 12, wherein two limbs of the outwardly or inwardly bent region are arranged in parallel with one another.

14. A vehicle seat as claimed in claim 13, wherein at least one of the two limbs has a corrugated profile.

15. A vehicle seat as claimed in claim 9, further comprising a rolling raceways in an interaction region of the seat rails, wherein rolling elements of the rolling raceway have at least two or more rail contacts.

16. The vehicle seat as claimed in claim 9, wherein the one of the side walls comprises a first side wall portion and a second side wall portion, the first side wall portion being bent relative to the first side wall portion, wherein an oblique angle is defined by the first side wall portion and the second side wall portion, the first side wall portion and the second side wall portion defining a bending area, the bending area being aligned with the upper edge of the lower seat rail.

17. The vehicle seat as claimed in claim 9, wherein the one of the side walls comprises a first side wall portion and a second side wall portion, the first side wall portion being bent relative to the first side wall portion, wherein an oblique angle is defined by the first side wall portion and the second side wall portion, the first side wall portion and the second side wall portion defining a bending area, the bending area being located opposite an upper wall portion of the lower seat rail, the upper wall portion comprising the upper edge.

18. The vehicle seat as claimed in claim 17, wherein the bending area is area at a height equal to a height of the upper wall portion.

19. The longitudinal adjustment element as claimed in claim 8, wherein the one of the side walls comprises a first side wall portion and a second side wall portion, the first side wall portion being bent relative to the first side wall portion, wherein an oblique angle is defined by the first side wall portion and the second side wall portion, the first side wall portion and the second side wall portion defining a bending area, wherein the bending area is located at a height equal to a height of the upper edge.

20. The rail pair as claimed in claim 1, wherein the one of the side walls comprises a first side wall portion and a second side wall portion, the first side wall portion being bent relative to the first side wall portion, wherein an oblique angle is defined by the first side wall portion and the second side wall portion, the first side wall portion and the second side wall portion defining a bending area, wherein the bending area is located at a height equal to a height of the upper edge.

* * * * *